United States Patent [19]

Bobert

[11] Patent Number: 4,891,731

[45] Date of Patent: Jan. 2, 1990

[54] GAS DISCHARGE OVER-VOLTAGE ARRESTOR HAVING A LINE OF IGNITION

[75] Inventor: Peter Bobert, Berlin, Fed. Rep. of Germany

[73] Assignee: Siemens Aktiengesellschaft, Berlin and Munich, Fed. Rep. of Germany

[21] Appl. No.: 132,201

[22] Filed: Dec. 14, 1987

[30] Foreign Application Priority Data

Dec. 15, 1986 [DE] Fed. Rep. of Germany ....... 3642818
Nov. 12, 1987 [EP] European Pat. Off. ........ 87730142.4

[51] Int. Cl.[4] .............................................. H02H 3/04

[52] U.S. Cl. .................................... 361/118; 361/120; 313/291; 313/311; 313/555; 313/596

[58] Field of Search ................. 361/91, 111, 117, 118, 361/120; 313/231.11, 306, 324, 291, 311, 595, 596, 581

[56] References Cited

U.S. PATENT DOCUMENTS

| | | | |
|---|---|---|---|
| 3,431,452 | 3/1969 | Hale et al. | 313/231 |
| 3,702,952 | 11/1972 | Cassidy et al. | 313/217 |
| 4,491,893 | 1/1985 | Toda | 361/120 |
| 4,493,006 | 1/1985 | Lange et al. | 361/120 X |
| 4,578,733 | 3/1986 | Shigemori et al. | 361/120 |

FOREIGN PATENT DOCUMENTS

| | | |
|---|---|---|
| 2032899 | 1/1972 | Fed. Rep. of Germany . |
| 2714122 | 10/1978 | Fed. Rep. of Germany . |
| 2856581 | 7/1979 | Fed. Rep. of Germany . |
| 2153138 | 8/1985 | United Kingdom . |

*Primary Examiner*—Derek S. Jennings
*Attorney, Agent, or Firm*—Hill, Van Santen, Steadman & Simpson

[57] ABSTRACT

A gas discharge over-voltage arrestor having a narrow tolerance range of response voltages due to the quality of a line or lines of ignition. A gas discharge over-voltage arrestor has one or more lines of ignition without additives and impurities and has a relatively narrow resistance tolerance given a defined nominal value of resistance whose tolerance range amounts to ½ a power of 10 in a logarithmic scale. Every line of ignition is produced by a non-contacting sputtering of carbon particles and is connected to the electrodes over its full width. A reduction in the variation of the response voltage is thereby achieved. The invention is particularly suitable for gas discharge over-voltage arrestors in a glass housing.

2 Claims, 2 Drawing Sheets

FIG. 3
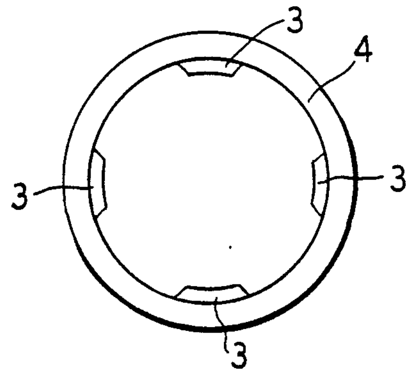
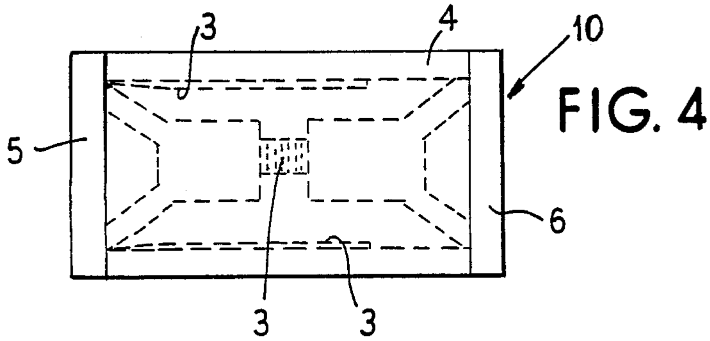
FIG. 4
FIG. 5
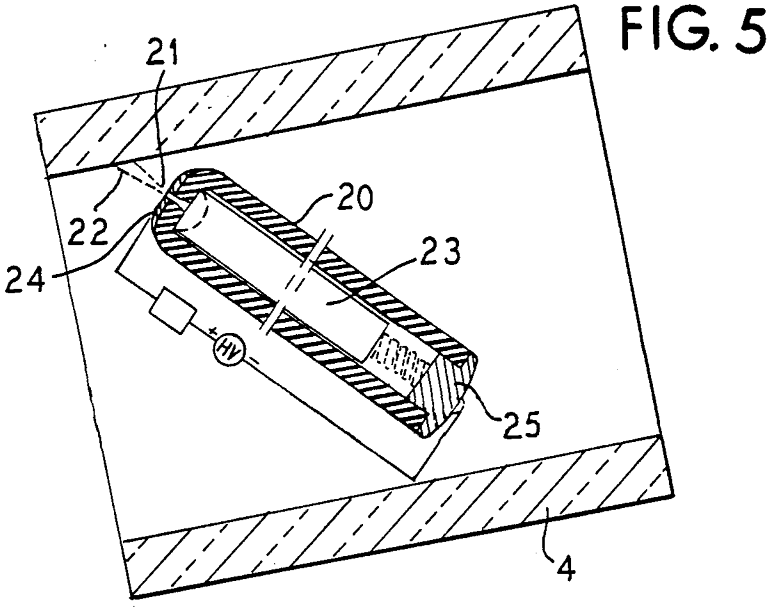

GAS DISCHARGE OVER-VOLTAGE ARRESTOR HAVING A LINE OF IGNITION

BACKGROUND OF THE INVENTION

The invention is directed to a gas discharge overvoltage arrestor having a housing sealed from the atmosphere space and composed of at least two electrodes and a wall of insulating material on which an ignition coating, at least one line of ignition or a surface of ignition is located. The line of ignition is essentially composed of carbon particles which are applied to the wall of the insulating material in a non-contacting fashion.

A gas discharge over-voltage arrestor is disclosed in U.S. Pat. No. 3,431,452. An ignition coating or, respectively, a line of ignition of metal, metal oxide particles or carbon particles is applied to an inside generated surface of the insulating member in a non-contacting fashion by spraying and is subsequently subjected to a heat treatment. In the known gas discharge over-voltage arrestor, however, a specific value of surface conductivity of the ignition coating, of the line of ignition or of the surface of ignition is not well defined. A range of tolerance for the variation of this value of surface conductivity is likewise not defined. As a result thereof, the risk is present in the known gas discharge over-voltage arrestor that discharge currents flowing via the line of ignition are not in a favorable range and that an overload of the line of ignition can occur, particularly given weak glow discharges. The line of ignition can thereby at least partially evaporate, whereby the response characteristic of the gas discharge over-voltage arrestor would change. Under certain conditions, therefore, the useful life of the known gas discharge over-voltage arrestor is lower than the useful life of its remaining component parts.

SUMMARY OF THE INVENTION

An object of the present invention is to provide a gas discharge over-voltage arrestor having a line of ignition which can be formed repeatedly according to rigid specifications quality and with relatively close tolerances of the value of surface conductivity.

In a gas discharge over-voltage arrestor of the type initially cited, this object is achieved in that the line of ignition is free of contaminants and additives before the housing is closed and its resistance over its entire length has a nominal value in the range of $10^4$ through $10^7$ ohms, preferably $10^6$ ohms, and, independently of the length, the deviation of the value of resistance from the nominal value is not greater than $\frac{1}{2}$ of a power of 10 in a logarithmic scale.

As a result thereof, the current flowing via the line of ignition is in a relatively narrow band of tolerance. Local overheatings and destructions of the line of ignition caused as a result of evaporation of contaminants and additives which would reduce the useful life of the overall gas discharge over-voltage arrestor are prevented. Moreover, a region for the discharge current flowing in the line of ignition is bounded, whereby the emission of electrons from the line of ignition effected by field emission for a fast built-up of discharge is optimized for a high response speed, particularly given steep over-voltages. Impurities in the material of the line of ignition which could lead to incorrect levels of field strength or contact resistance are not present. Overall, the value of resistance of the line of ignition is established in a region optimum for the function of the gas discharge over-voltage arrestor. This particularly enables defined values of the response voltages to be observed with only small variations.

It can be advantageous that lines of ignition are singly or multiply provided in a plurality corresponding to the number of electrodes and the lines of ignition in contact with the electrodes over their full width. Contact resistances between the electrodes and the line of ignition are thereby avoided. Further, the line of ignition is constantly galvanically connected to respectively one of the electrodes. An additional variation in the values of response voltage is noticeably reduced by this reliable, galvanic coupling.

When, as in an exemplary embodiment of the gas discharge over-voltage arrestor of the present invention, a wall of insulating material is composed of glass, cost-beneficial manufacture of the arrestor results. The line of ignition sputtered on in non-contacting fashion with extremely narrow specified values of resistance also has an advantageous influence on the response behavior of the over-voltage arrestor, This is likewise true for gas discharge over-voltage arrestors of the present invention whose walls of insulating material have a glass-coated surface.

The particle size of the carbon particles in the line of ignition of the gas discharge over-voltage arrestor of the present invention advantageously lies below 10 μm in a preferred development of the invention. The line of ignition is thereby of an optically uniform quality as well as of a pronounced, dark color and the layer forming it has the desired, low variation of values of resistance. This creates the pre-requsite of also guaranteeing uniform quality in a mass production.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 3 is an axial view of a cylindrical housing part of the gas discharge over-voltage arrestor having a plurality of lines of ignition;

FIG. 4 is a cross-sectional view of the FIG. 3 arrestor; and

FIG. 5 depicts a device for applying the lines of ignition.

DESCRIPTION OF THE PREFERRED EMBODIMENT

Figure 1:
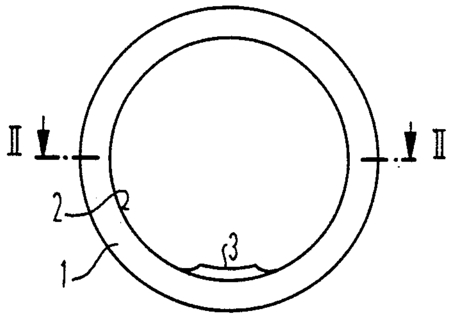
FIG. 1 is an axial view of a cylindrical housing part of the gas discharge over-voltage arrestor.
Figure 2:
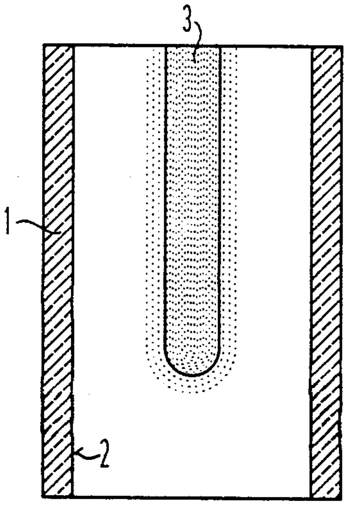
FIG. 2 is a cross-sectional view of the FIG. 1 housing part.

A cylindrical housing part 1 of a gas discharge over-voltage arrestor forms a wall of insulating material in the present example and is composed of ceramic and has an inside wall surface 2. Electrodes (see FIG. 4) residing coaxially opposite one another form a discharge path of the gas discharge overvoltage arrestor and are each drawn around the upper or, respectively, lower edge of the cylindrical housing part 1 and are connected thereto in a vacuum-tight manner. A line of ignition 3 is applied in a non-contacting fashion on the inside wall 2.

However, at least two such lines of ignition 3 are present, these being applied to the inside wall 2 lying opposite one another. FIGS. 3 and 4 depict a wall 4 of a cylindrical housing part having four lines of ignition 3. The lines of ignition 3 thereby respectively proceed alternately from the upper and, respectively, lower edge of the housing part 1. The lines of ignition 3 are thereby also alternately connected to the electrodes (see FIG. 4) which are attached to the edges of the housing part 1 in the gas discharge over-voltage arrestor, being connected thereto uniformly and interruption-free in conductive fashion.

FIG. 4 shows an over-voltage arrestor 10 having a wall 4 of a housing part and two electrodes 5 and 6. Lines of ignition 3 are applied to an inside of the wall 4. FIG. 5 depicts a device 20 used for the application of the lines of ignition 3 to the inside of the wall 4. Particles 22 are shown emerging from the nozzle 21 of the device 20. The particles 22 are generated by erosion from the material 23 and are ejected from the nozzle 21 due to a voltage differential between electrodes 24 and 25. Such a device 20 is disclosed in German Reference DE-OS No. 28 56 581. The particles 22 are soot-like particles, such as carbon particles, and the material 23 is a dust-like material.

During application and, potentially, during a subsequent solidification, the line of ignition 3 is not touched by any tools whatsoever. Cathode sputtering methods, chemical vapor deposition (CVD) methods, or spraying methods are suitable for the manufacture of such a line of ignition. The application of diaphragms for limiting the line of ignition is thereby usually expedient or necessary. The lines of ignition can be advantageously applied with an arc erosion method which is disclosed, for example, by German published application No. 28 56 581 and is utilized therein for coloring a non-striking printer. Cover diaphragms are thereby not required.

However, based on the simple variation of the thickness of the graphite layer in this latter method, the overall value of the resistance of the line of ignition 3 can be set to the nominal value of $10^6$ ohms regardless of the length thereof and can be kept in the desired, comparitively extremely narrow band of tolerance of $0.5 \times 10^6$ through $5 \times 10^6$ ohms. The current flow in the line of ignition 3 is thereby essentially dependent on the applied voltage and is proportional thereto. Since, moreover, the line of ignition 3 is applied without impurities or additives and its full cross section extends up to the edge of the housing part 1 so that a complete galvanic connection of its entire cross-section to the electrodes can be achieved, a low variation of the values of response voltage can be achieved. In addition, a high useful life of the line of ignition 3 is also simultaneously guaranteed in the case of frequent, weak glow discharges which principally result from the line of ignition 3. This results from the homogeneous structure and purity of the graphite layer since no local elevations of resistance or interruptions due to partially evaporating additives of the line of ignition 3 occur.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A gas discharge over-voltage arrestor having a housing closed relative to an outside space and composed of at least two electrodes of a wall of insulting material on an inner side of which at least one ignition coating in the form of a line of ignition or a surface of ignition is located, whereby said ignition coating is essentially composed of carbon particles which are applied to the inner side of the wall of insulating material in non-contacting fashion, comprising the carbon particles having a particle size less than or equal to 10 $\mu$m, whereby the carbon particles are applied to the inner side of the wall via a nozzle by means of an arc-erosion method.

2. The gas discharge over-voltage arrestor according to claim 1, wherein the ignition coating is lines of ignition and are singly or multiply provided in a number corresponding to the number of electrodes in the arrestor and wherein the lines of ignition are in contact with the electrodes over their full width.

* * * * *